United States Patent [19]
Maeda et al.

[11] Patent Number: 5,825,518
[45] Date of Patent: Oct. 20, 1998

[54] OPTICAL TRANSMISSION UNIT

[75] Inventors: Kazuki Maeda, Neyagawa; Koichi Masuda; Hiroaki Nakata, both of Hirakata, all of Japan

[73] Assignee: Matsushita Electric Industrial Co., Ltd., Osaka-fu, Japan

[21] Appl. No.: 613,226

[22] Filed: Mar. 8, 1996

[30] Foreign Application Priority Data

Mar. 9, 1995 [JP] Japan ................................ 7-050222

[51] Int. Cl.$^6$ ..................................... H04J 14/02
[52] U.S. Cl. ..................... 359/124; 359/125; 359/182; 359/181
[58] Field of Search ..................... 359/124–125, 359/132–133, 181–183, 161, 134

[56] References Cited

U.S. PATENT DOCUMENTS

| | | | |
|---|---|---|---|
| 5,351,148 | 9/1994 | Maeda et al. | 359/133 |
| 5,570,219 | 10/1996 | Shibutani et al. | 359/125 |
| 5,680,238 | 10/1997 | Masuda | 359/132 |

FOREIGN PATENT DOCUMENTS

| | | |
|---|---|---|
| 6-224852 | 8/1994 | Japan . |
| 7-235905 | 9/1995 | Japan . |

*Primary Examiner*—Kinfe-Michael Negash
*Attorney, Agent, or Firm*—Wenderoth, Lind & Ponack, L.L.P.

[57] ABSTRACT

An AM signal source frequency-multiplexes and outputs a plurality of AM signals. A soft clipper, which is formed by an amplifier or the like, nonlinearly loosely limits a large amplitude portion (impulsively changed portion) of the frequency-multiplexed AM signal by using its saturation property. Thereafter, an attenuator performs level adjustment for setting the signal at a prescribed degree of optical modulation. On the other hand, a 16QAM signal source frequency-multiplexes and outputs a plurality of 16QAM signals having different carrier frequencies. A frequency multiplexing part further frequency-multiplexes the AM multiplex signal with the 16QAM multiplex signal. An optical transmitter intensity-modulates a laser output beam with the frequency multiplex signal from the frequency multiplexing part and transmits the same. No clipping distortion occurs at this time. An optical signal from the optical transmitter is transmitted to a receiving system through an optical fiber member and is demodulated.

24 Claims, 2 Drawing Sheets

RATIO OF INPUT LEVEL IN SOFT CLIPPER 130 (dB)

OPTICAL TRANSMISSION UNIT

BACKGROUND OF THE INVENTION

1. Field of the Invention

The present invention relates to optical transmission units and method and more specifically, it relates to a unit and method for further multiplexing a frequency multiplexed signal which is obtained by frequency-multiplexing a plurality of modulation signals of the same modulation system with a digital modulation signal such as orthogonal amplitude modulation signals of M values or a frequency multiplexed signal thereof for optical transmission.

2. Description of the Background Art

When a frequency multiplexed signal of analog modulation signals such as AM signals is further frequency-multiplexed with digital modulation signals of M values employing orthogonal amplitude modulation (or a frequency multiplexed signal thereof) for intensity-modulating a laser beam with the resulting multiplexed signal for transmission, while the total sum of the degrees of optical modulation of each modulation signal exceeds 1 to cause clipping of the frequency multiplex signal in a laser emitting element, an amplitude value of the multiplexed signal is clipped by a threshold value of the laser emitting element. At this time, the multiplexed signal is clipped as if it is sharply linearly cut. Therefore, when the amplitude value of the multiplexed signal is time-differentiated in an arbitrary time period, a point where the differential value diverges, i.e., an undifferentiable point, occurs. It is known that such an undifferentiable point causes impulsive distortion.

Literature such as "Analysis of BER of 16QAM Signal in AM/16QAM Hybrid Optical Transmission System" by K. Maeda et. al, Electronics Letter 29, No. 7, pp. 640 to 642 (1993) have reported that an error rate of a digital modulation signal is detrimentally influenced by the aforementioned impulsive distortion. Such a problem is thought to also occur when digital modulation signals (or a frequency multiplexed signal thereof) are further frequency-multiplexed with a frequency multiplexed signal of other digital modulation signals which are set at a large total sum of degrees of optical modulation for optical transmission, such as in the case of frequency-multiplexing 16QAM signals with a frequency multiplexed signal of 256 QAM signals for optical transmission.

It is inferred from the aforementioned literature that the influence exerted on transmission quality (error rate) by impulse distortion is equivalent among all digital modulation signals, and this problem is unavoidable as far as the degrees of optical modulation are set to satisfy conditions causing clipping in a laser emitting element.

Japanese Patent Laid Open No. 6-224852, 1994 (hereinafter referred to as a first prior art) suggests a method of coping with impulse distortion by combining the most efficient setting of degrees of optical modulation with an optimum error correction technique, while recognizing the aforementioned influence exerted by impulse distortion.

However, the first prior art regards the clipping distortion as an unavoidable problem which occurs in the system of intensity-modulating a multiplexed signal for optical transmission. That is to say, the first prior art takes indirect countermeasures by combining the optimum error correction technique with the setting of the degrees of optical modulation for minimizing the influence while allowing deterioration of the error rate, thereby reducing such deterioration of the error rate. Thus, the first prior art is not adapted to eliminate the impulse distortion itself caused by clipping.

On the other hand, papers titled "Reduction of Clipping Deterioration in A/D Hybrid Optical SCM Transmission by Preclipping" published by Akihiro Kanazawa et. al. in Denshi Joho Tsushin Gakkai Shuki Taikai, 1994, B-880, and titled "Eliminating Clipping—Induced Transmission Impairment in QAM Channels in a Hybrid AM-VSB/QAM Fiber-Optic System by Preclipping", OFC '95, TuN7, published by Q. Jiang and M. Kavehrad on Feb. 28, 1995 (these two papers are hereinafter called a second prior art) disclose means for previously making signal amplitude limitation which is substantially similar to the clipping of the multiplexed signal in a laser, i.e., amplitude limitation of sharply linearly cutting the signal, in the stage of an electric signal using a limiter or a preclipping circuit, thereby preventing occurrence of clipping distortion in the stage of the laser emitting element.

In the technique of signal amplitude limitation according to the second prior art, an undifferentiable point occurs in the signal amplitude of the multiplexed signal similarly to the clipping in the laser emitting element, and impulsive distortion takes place in the stage of the electric signal. Therefore, each of the papers describes means of removing the impulsive distortion by using a low-pass filter and thereafter multiplexing digital modulation signals for optical transmission. The second prior art (particularly the former paper) further describes that the impulse distortion is remarkably reduced at frequencies higher than a cutoff frequency of the low-pass filter while the distortion reducing effect is decreased if the cutoff frequency is drastically reduced. This is due to the fact that an input signal waveform of the laser approaches the shape before preclipping if the removal of distortion is too much increased. Therefore, when the method of reducing distortion disclosed in the second prior art is employed, the cutoff frequency of the low-pass filter must be separated from the analog modulation signals by a constant value.

In the second prior art, as hereinabove described, the signal amplitude limitation is made such that an undifferentiable point occurs in the signal amplitude in principle while an amplitude value is limited in the electric signal, and hence a limiter circuit and a low-pass filter must be provided in addition to the conventional structure. Further, the second prior art requires a constant space between an analog frequency multiplexed signal the digital modulation signals, and hence a transmission band for the digital modulation signals is limited.

SUMMARY OF THE INVENTION

Accordingly, an object of the present invention is to provide an optical transmission unit and method which suppresses occurrences of clipping distortions, thus enabling transmission of a high-quality signal in cases of multiplexing digital modulation signals of a prescribed modulation system, or a frequency multiplexed signal thereof with a frequency multiplexed signal of other analog or digital modulation signals, which are set at a large total sum of degrees of optical modulation, for optical transmission.

Another object of the present invention is to provide an optical transmission unit and method which can suppress occurrences of clipping distortions in a simple structure, with small limitation of a transmission band.

In order to attain the aforementioned objects, the present invention has the following characteristics:

A first aspect of the present invention is directed to an optical transmission unit and method for further multiplexing a frequency multiplexed signal which is obtained by frequency-multiplexing a plurality of modulation signals of the same modulation system with digital modulation signals of a prescribed modulation system or a frequency multiplexed signal thereof, and this optical transmission unit comprises:

a multiplexing part multiplexing the frequency multiplexed signal with the digital modulation signals, an optical transmission part which intensity modulates a laser output beam with a multiplexed signal which is outputted from the multiplexing part for transmission, and an amplitude limitation part which nonlinearly loosely limits the signal amplitude in any portion precedent to the optical transmission part so that the total sum of degrees of the optical modulation of signals, which are inputted in the optical transmission part, is not in excess of 1.

According to the first aspect, as described above, a large signal amplitude portion (impulsively changed portion) is limited in the stage of an electric signal before reaching the optical transmission part so that the total sum of the degrees of optical modulation of the signals which are inputted in the optical transmission part is not in excess of 1, thereby preventing impulsive distortion from being caused in the optical transmission part by clipping. Further, the amplitude limitation is so nonlinearly loosely performed that no undifferentiable point occurs in the signal after the amplitude limitation, and hence no impulsive distortion occurs by such amplitude limitation. Thus, a low-pass filter is not required for removing impulsive distortion caused by preclipping dissimilarly to the prior art, and the structure is simplified with no limitation of a transmission band.

The amplitude limitation part may nonlinearly loosely limit a signal amplitude of a portion where the total sum of degrees of optical modulation is in excess of 1 in the frequency multiplexed signal, or nonlinearly loosely limit a signal amplitude of a portion where the total sum of degrees of optical modulation is in excess of 1 in an output signal from the multiplexing part. The probability of occurrence of an amplitude causing clipping in a multiplexed signal is extremely small. Therefore, the amplitude limitation employed in the present invention merely exerts extremely small influence on the level of each modulation signal, and the degree of optical modulation of each modulation signal remains substantially unchanged. Thus, impulsive distortion caused by clipping can be suppressed without reducing the transmission quality.

In a preferred embodiment, a ratio of the signal amplitude, which is limited by the amplitude limitation part, to the maximum amplitude of each modulation signal included in the frequency multiplexed signal is selected to be equivalent to, or in excess of, an optical modulation ratio of input/output signals in the case of inputting an output signal of the multiplexing part in the optical transmission part without the amplitude limitation part. Thus, an influence exerted on the transmission quality of the digital modulation signals by distortion caused by the amplitude limitation can be reduced.

The amplitude limitation part is formed, for example, by an amplifier having an output saturation property. When the amplitude limitation part is formed, for example, by such an amplifier, the amplitude limitation on a wide-band frequency multiplexed signal can be implemented using a simple structure.

When the amplitude limitation part is formed by the amplifier and a signal amplitude of a portion where the total sum of the degrees of optical modulation in the frequency multiplexed signal is in excess of 1 is nonlinearly loosely limited by the amplifier, a ratio of a signal amplitude substantially providing 1 dB gain compression power of the amplifier to the maximum value of each modulation signal included in the frequency multiplexed signal which is inputted in the amplifier is preferably selected to be equivalent to or in excess of an optical modulation ratio of input/output signals in case of inputting an output signal of the multiplexing part in the optical transmission part through the amplifier. Thus, an influence exerted on the transmission quality of the digital modulation signals due to distortion caused by amplitude limitation can be reduced.

Each modulation signal included in the frequency multiplexed signal may be an analog modulation signal such as an AM signal or an FM signal. On the other hand, the digital modulation signals may be orthogonal amplitude modulation signals of M values.

An optical signal received on a receiving side is separated into the frequency multiplexed signal and the digital modulation signals, and the separated frequency multiplexed signal is preferably corrected by a correction part having input/output characteristics which are reverse to the characteristics of the amplitude limitation part. Thus, distortion included in the frequency multiplexed signal can be improved. At this time, the correction part is preferably adapted to correct tertiary distortion of the frequency multiplexed signal, since the tertiary distortion is the maximum distortion among distortions caused in the amplitude limitation part.

A second aspect of the present invention is directed to an optical transmission unit and method for further multiplexing a frequency multiplexed signal which is obtained by frequency-multiplexing a plurality of modulation signals of the same modulation system with digital modulation signals of a prescribed modulation system or a frequency multiplexed signal thereof, and this optical transmission unit comprises:

a multiplexing part which multiplexes the frequency multiplexed signal with the digital modulation signals, an optical transmission part which intensity modulates a laser output beam with a multiplexed signal which is outputted from the multiplexing part for transmission, and an amplitude limitation part which nonlinearly loosely limits the signal amplitude in any portion precedent to the optical transmission part so that the total sum of degrees of optical modulation of signals inputted in the optical transmission part is not in excess of 1 and no undifferentiable point occurs.

According to the second aspect, as described above, a large signal amplitude portion (impulsively changed portion) is limited in the stage of an electric signal before reaching the optical transmission part so that the total sum of the degrees of optical modulation of the signals which are inputted in the optical transmission part is not in excess of 1, thereby no impulsive distortion being caused in the optical transmission part by clipping. Further, the amplitude limitation is made to cause no undifferentiable point, thereby no impulsive distortion being caused in the signal after the amplitude limitation. Thus, a low-pass filter is not required for removing impulsive distortion caused by preclipping dissimilarly to the prior art, and the structure is simplified with no limitation of the transmission band.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
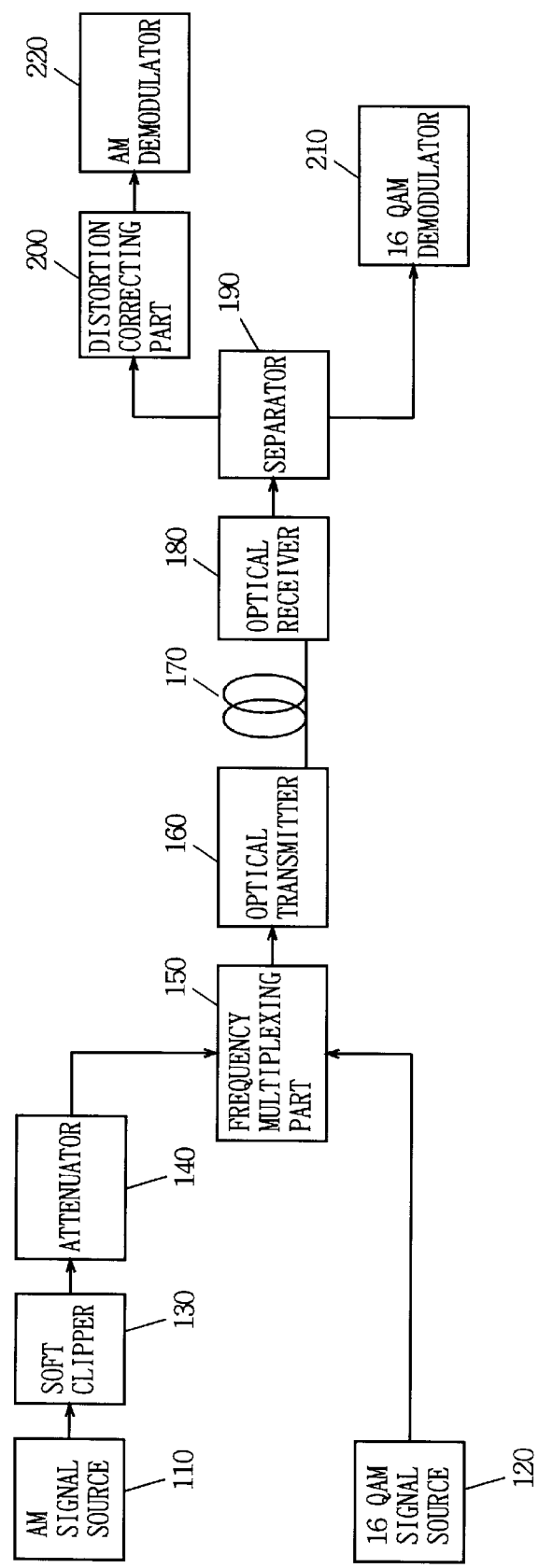
FIG. 1 is a block diagram showing the structure of an optical transmission unit according to an embodiment of the present invention.

FIG. 1 is a block diagram showing the structure of an optical transmission unit according to an embodiment of the present invention. Referring to FIG. 1, the optical transmission unit according to this embodiment comprises an AM signal source 110, a 16QAM signal source 120, a soft clipper 130, an attenuator 140, a frequency multiplexing part 150, an optical transmitter 160, an optical fiber 170, an optical receiver 180, a separator 190, a distortion correcting part 200, a 16QAM demodulator 210, and an AM demodulator 220.

The soft clipper 130, which is formed by an amplifier or the like having a saturation property, amplifies a frequency multiplexed signal of AM signals provided from the AM signal source 110 and limits an amplitude of the frequency multiplexed signal using the saturation property of the amplifier.

The operation of this embodiment is subsequently described. The AM signal source 110 modulates an NTSC signal to VSB-AM signals having different carrier frequencies and regularizes the levels thereof, for frequency-multiplexing and outputting. The 16QAM signal source 120 modulates a digital compressed picture signal to 16QAM signals having different carrier frequencies, and regularizes the levels thereof, for frequency-multiplexing and outputting. A large amplitude portion (impulsively changed portion) of the frequency-multiplexed AM signal is limited in the soft clipper 130. The attenuator 140 performs level adjustment for setting each AM signal which is outputted from the soft clipper 130 at a prescribed degree of optical modulation. The frequency multiplexing part 150 further frequency-multiplexes the AM multiplexed signal with the 16QAM multiplexed signal. The optical transmitter 160 intensity-modulates a laser output beam with the frequency multiplexed signal from the frequency multiplexing part 150 for transmission. An optical signal outputted from the optical transmitter 160 is transmitted through the optical fiber 170, and is converted back to an electric signal in the optical receiver 180. The converted electric signal is separated into the AM multiplexed signal and the 16QAM multiplexed signal by the separator 190. The separated 16QAM signal is inputted in the 16 QAM demodulator 210 and demodulated. The separated AM multiplexed signal is subjected to correction of distortion resulting from the amplitude limitation by the distortion correcting part 200, and thereafter demodulated by the AM demodulation part 220.

Figure 2:
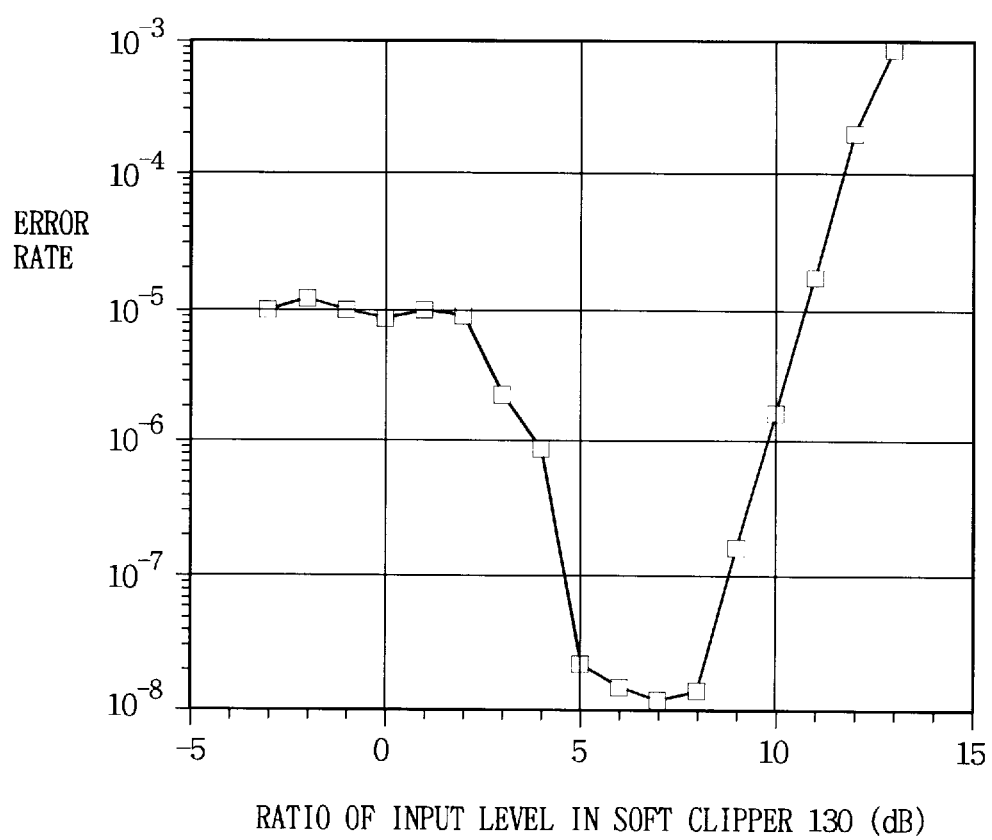
FIG. 2 illustrates change characteristics of an error rate of 16QAM signals upon changes of an input level of AM signals in a soft clipper 130 in case of transmitting a multiplexed optical signal under conditions of a degree 5%/ch. of AM signal optical modulation and 40 AM signals.

FIG. 2 illustrates exemplary improvements of an error rate according to the aforementioned embodiment. That is to say, FIG. 2 illustrates error rate characteristics when an input level is changed in the soft clipper 130 for amplitude-limiting the AM multiplex signal. In this example, the 16QAM signals are at a fixed degree of optical modulation, and a CNR (carrier-to-noise ratio) is at a constant level of 28 dB. The degree of optical modulation of the AM signals is 5% per wave, and the number of multiplexing is 40. The output level of the soft clipper 130, which is varied with the levels of the input signals, is maintained constant by adjusting attenuation of the attenuator 140, thereby maintaining the degree of optical modulation of the AM signals at 5%/ch.

When the input level in the soft clipper 130 is small and the effect of the amplitude limitation by the output saturation property of the soft clipper 130 is small, the error rate is about $10^{-5}$ and deterioration of the error rate by clipping is observed although the CNR of the 16QAM signals is 28 dB. When the input level in the soft clipper 130 increases and the effect of the amplitude limitation starts to appear, the error rate is reduced and improved to about $10^{-8}$ at the same degree of optical modulation. This is because the occurrence of clipping in the laser beam source is remarkably suppressed due to soft clipping by the output saturation property of the soft clipper 130. The term "soft clipping" indicates nonlinear loose clipping which is like the sharp linear clipping caused in the laser beam source. That is to say, the signal amplitudes are differentiable in all time periods after the soft clipping.

The laser clipping is a phenomenon which takes place due to linear limitations of the laser output level at the threshold value. The input/output characteristics of the laser beam source are so steep in the vicinity of the threshold value that steep level limitation occur at random. Therefore, distortion caused by clipping of the laser beam source has an extremely impulsive property, and exerts a significant influence on transmission quality of digital modulation signals such as the 16QAM signals.

On the other hand, the output characteristic of the output signal from the soft clipper 130 loses linearity when a constant input level is exceeded, to exhibit a saturation property. This is a similar phenomenon to the clipping in the laser beam source, while the output is slightly increased with respect to the input also in the saturation region and the saturation property is loose in the case of the soft clipper 130. When the amplitude of the multiplexed signal is limited by the output saturation property of the soft clipper 130, therefore, although distortion takes place, no amplitude property with severe impulsive level fluctuation is provided dissimilarly to in the laser beam source and level fluctuation is small.

The rate of the signal limited in the soft clipper 130 is rendered equivalent to or in excess of the clipping in the laser beam source. The AM multiplexed signal thus subjected to amplitude limitation is further multiplexed with the 16QAM multiplex signal in the frequency multiplexing part 150. The AM multiplex signal is at a higher level than the 16QAM multiplexed signal, and the amplitude is not changed much after multiplexing. When the output of the frequency multiplexing part 150 is inputted in the laser beam source, therefore, such a probability that the inputted signal is below the threshold value of the laser beam source is extremely reduced since the signal amplitude mainly causing clipping is previously limited. Therefore, occurrence of impulse distortion in the laser beam source is extremely suppressed, and the error rate can be improved.

Referring to FIG. 2, a ratio of an amplitude providing 1 dB gain compression power of the soft clipper 130 to an amplitude of each AM signal is almost equivalent to the optical modulation ratio of the input/output signals of the optical transmitter 150 in case of making no amplitude limitation, when the input level in the soft clipper 130 is 0 dB. Thus, it is understood that an effect of improving the error rate is attained in a region where the ratio of the amplitude providing 1 dB gain compression power of the soft clipper 130 to the amplitude of each AM signal is at least equivalent to the optical modulation ratio. When the input level in the soft clipper 130 exceeds a constant value, however, the error rate is deteriorated to the contrary. This is because the distortion caused in the soft clipper 130 is increased when the constant input level is exceeded, to influence the error rate property of the 16QAM signals.

The effect of the amplitude limitation has the optimum value as described above. With the optimum value, however, the distortion caused in the soft clipper 130 is also disadvantageously increased to some extent. If the requirement for the distortion is not so strict, it is preferable to give priority to the improvement of the error rate characteristic and to match the input level in the soft clipper 130 with the optimum point minimizing the error rate. This is extremely effective in case of employing signals such as FM signals having resistance against distortion are employed as the analog modulation signals, for example.

While the amplitude of the multiplexed signal is limited by the soft clipper 130, it is noted that multiplex signal the amplitude of the multiplexed signal is limited. Further, a probability of occurrence of a large amplitude to be limited is extremely small. Therefore, in the amplitude of the multiplexed signal according to the present invention, the levels of the respective AM signals are hardly changed and hence the degrees of optical modulation also remain unchanged.

The distortion caused in the soft clipper 130 includes large tertiary distortion and such distortion caused in the soft clipper 130 is dominant on the receiving side as compared with distortion caused in the laser. Therefore, when required values of distortion of the AM signals are larger than distortion caused in the soft clipper 130, the output of the optical receiver 180 is separated into the AM multiplexed signal and the 16QAM multiplexed signal for correcting the tertiary distortion caused in the soft clipper 130, thereby attaining the distortion required for the AM signals. When only the amplitude of the AM multiplexed signal is limited by the soft clipper 130 in accordance with the embodiment, only the distortion of the AM multiplexed signal caused by the soft clipper 130 may be corrected on the receiving side through an operation which is easier than an operation of amplitude-limiting the multiplexed signal after multiplexing the AM multiplexed signal with the 16QAM multiplexed signal. However, if such an advantage is not desired, the soft clipper 130 may alternatively be arranged at the following stage of the frequency multiplexing part 150.

Although the above embodiment has been described with reference to the case of multiplexing a frequency multiplexed signal of 16QAM signals with a frequency multiplexed signal of AM signals, the present invention is also applicable to the case of further frequency-multiplexing digital modulation signals (or a frequency multiplexed signal thereof) with a frequency multiplexed signal of other digital modulation signals in which the total sum of degrees of optical modulation is set at a large value, such as the case of frequency-multiplexing 16QAM signals or a frequency multiplexed signal thereof with a frequency multiplexed signal of 256 QAM signals, for example. In this case, impulse distortion is caused by the latter digital modulation signals which are set at large degrees of optical modulation in a high probability, and hence at least the amplitudes of the digital modulation signals may be soft-clipped.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical transmission unit in which a first frequency multiplexed signal of a plurality of modulation signals from a same modulation system is further multiplexed with a plurality of digital modulation signals, or a second frequency multiplexed signal thereof, of a prescribed modulation system, said optical transmission unit comprising:

a multiplexing means for multiplexing the first frequency multiplexed signal with the plurality of digital modulation signals, or the second frequency multiplexed signal thereof, to obtain an output multiplexed signal;

an optical transmission means for intensity-modulating a laser beam output according to the output multiplexed signal of said multiplexing means to obtain an optical transmission signal; and an amplitude limitation means for non-linearly loosely limiting a signal amplitude existing prior to said optical transmission means, wherein said amplitude limitation means comprises an amplifier having an output saturation property such that a total sum of degrees of optical modulation of signals being inputted to said optical transmission means is not greater than 1.

2. The optical transmission unit of claim 1, wherein said amplitude limitation means non-linearly loosely limits the signal amplitude where the total sum of degrees of optical modulation is greater than 1 in the first frequency multiplexed signal.

3. The optical transmission unit of claim 2, wherein a ratio of the signal amplitude being limited by said amplitude limitation means and a maximum amplitude of each modulation signal of the first frequency multiplexed signal is at least equivalent to an optical modulation ratio of input signals and output signals of said optical transmission means wherein the output multiplexed signal of said multiplexing means is inputted into said optical transmission means without being affected by said amplitude limitations means.

4. The optical transmission unit of claim 3, wherein the signal amplitude limited by said amplitude limitation means is substantially 1 dB gain compression power of said amplifier of said amplitude limitation means.

5. The optical transmission unit of claim 3, further comprising:

an optical receiving means for converting the optical transmission signal, being transmitted by said optical transmission means, into an electric signal;

a separation means for separating the electric signal of said optical receiving means into the first frequency multiplexed signal and the digital modulation signal or the second frequency multiplexed signal thereof; and a correction means, having input and output characteristics which are reverse to those of said amplitude limitation means, for correcting distortion of the first frequency multiplexed signal which is separated by said separation means.

6. The optical transmission unit according to claim 5, wherein said correction means corrects tertiary distortion of the first frequency multiplexed signal.

7. The optical transmission unit of claim 5, wherein said amplitude limitation means non-linearly loosely limits the signal amplitude where the total sum of degrees of optical modulation is greater than 1 in the output multiplexed signal of said multiplexing means.

8. The optical transmission unit of claim 1, wherein each modulation signal included in the frequency multiplexed signal is an analog modulation signal.

9. The optical transmission unit of claim 8, wherein the analog modulation signal is an AM signal.

10. The optical transmission unit of claim 8, wherein the analog modulation signal is an FM signal.

11. The optical transmission unit of claim 1, wherein the plurality of digital modulation signals are orthogonal amplitude modulation signals of M values.

12. An optical transmission method in which a first frequency multiplexed signal of a plurality of modulation signals from a same modulation system is further multiplexed with a plurality of digital modulation signals, or a second frequency multiplexed signal thereof, of a prescribed modulation system, said optical transmission method comprising:

multiplexing the first frequency multiplexed signal with the plurality of digital modulation signals, or the second frequency multiplexed signal thereof, to obtain an output multiplexed signal;

intensity-modulating a laser beam output according to the output multiplexed signal to obtain an optical transmission signal; and non-linearly loosely limiting a signal amplitude existing prior to said intensity-modulating operation using an output saturation property of an amplifier such that a total sum of degrees of optical modulation of signals is not greater than 1.

13. The optical transmission method of claim 12, wherein said non-linearly loosely limiting operation limits the signal amplitude where the total sum of degrees of optical modulation is greater than 1 in the first frequency multiplexed signal.

14. The optical transmission method of claim 13, wherein a ratio of the signal amplitude being limited by said non-linearly loosely limiting operation and a maximum amplitude of each modulation signal of the first frequency multiplexed signal is at least equivalent to an optical modulation ratio of input signals and output signals of said optical transmission means wherein the output multiplexed signal of said multiplexing operation is subjected to said intensity-modulating operation without being subjected to said non-linearly loosely limiting operation.

15. The optical transmission method of claim 14, wherein the signal amplitude limited by said non-linearly loosely limiting operation is substantially 1 dB gain compression power of the amplifier used in said non-linearly loosely limiting operation.

16. The optical transmission method of claim 14, further comprising:

converting the optical transmission signal into an electric signal;

separating the electric signal into the first frequency multiplexed signal and the digital modulation signal or the second frequency multiplexed signal thereof; and correcting distortion of the first frequency multiplexed signal.

17. The optical transmission method according to claim 16, wherein said correcting operation corrects tertiary distortion of the first frequency multiplexed signal.

18. The optical transmission method of claim 16, wherein said non-linearly loosely limiting operation limits the signal amplitude of the signal where the total sum of degrees of optical modulation is greater than 1 in the output multiplexed signal.

19. The optical transmission method of claim 12, wherein each modulation signal included in the frequency multiplexed signal is an analog modulation signal.

20. The optical transmission method of claim 19, wherein the analog modulation signal is an AM signal.

21. The optical transmission method of claim 19, wherein the analog modulation signal is an FM signal.

22. The optical transmission method of claim 12, wherein the plurality of digital modulation signals are orthogonal amplitude modulation signals of M values.

23. An optical transmission unit in which a first frequency multiplexed signal of a plurality of modulation signals from a same modulation system is further multiplexed with a plurality of digital modulation signals, or a second frequency multiplexed signal thereof, of a prescribed modulation system, said optical transmission unit comprising:

a multiplexing means for multiplexing the first frequency multiplexed signal with the plurality of digital modulation signals, or the second frequency multiplexed signal thereof, to obtain an output multiplexed signal;

an optical transmission means for intensity-modulating a laser beam output according to the output multiplexed signal of said multiplexing means to obtain an optical transmission signal;

an amplitude limitation means for non-linearly loosely limiting a signal amplitude existing prior to said optical transmission means, wherein said amplitude limitation means comprises an amplifier having an output saturation property such that a total sum of degrees of optical modulation of signals being inputted to said optical transmission means is not greater than 1; and an attenuator for adjusting the signal amplitude existing prior to said optical transmission means but after said amplitude limitations means such that the output multiplexed signal is at a predetermined level.

24. An optical transmission method in which a first frequency multiplexed signal of a plurality of modulation signals from a same modulation system is further multiplexed with a plurality of digital modulation signals, or a second frequency multiplexed signal thereof, of a prescribed modulation system, said optical transmission method comprising:

multiplexing the first frequency multiplexed signal with the plurality of digital modulation signals, or the second frequency multiplexed signal thereof, to obtain an output multiplexed signal;

intensity-modulating a laser beam output according to the output multiplexed signal to obtain an optical transmission signal;

non-linearly loosely limiting a signal amplitude existing prior to said intensity-modulating operation using an output saturation property of an amplifier such that a total sum of degrees of optical modulation of signals is not greater than 1; and adjusting the signal amplitude existing prior to said intensity-modulating operation but after said non-linearly loosely limiting operation such that the output multiplexed signal is at a predetermined level.

* * * * *